Figure 1:
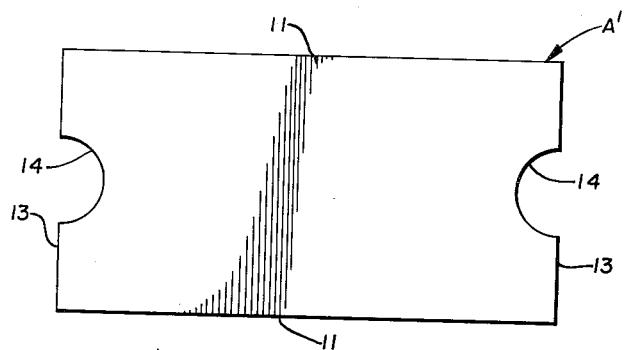

Sept. 25, 1962 A. P. DOUGLAS 3,055,097
METHOD OF MAKING A REINFORCED BRAZED TUBULAR JOINT
Filed May 12, 1958 2 Sheets-Sheet 1

INVENTOR.
ALVIN P. DOUGLAS
BY Golrick + Golrick
Atty's.

Sept. 25, 1962  A. P. DOUGLAS  3,055,097
METHOD OF MAKING A REINFORCED BRAZED TUBULAR JOINT
Filed May 12, 1958  2 Sheets-Sheet 2

INVENTOR.
ALVIN P. DOUGLAS
BY Golrick & Golrick
Atty's.

United States Patent Office 3,055,097
Patented Sept. 25, 1962

3,055,097
METHOD OF MAKING A REINFORCED BRAZED TUBULAR JOINT
Alvin P. Douglas, Nashville, Tenn., assignor to The Murray Ohio Manufacturing Company, Nashville, Tenn., a corporation of Ohio
Filed May 12, 1958, Ser. No. 734,477
1 Claim. (Cl. 29—471.7)

The present invention is concerned generally with a brazed tubular joint; and more particularly with structure for a reinforced brazed joint between a head tube and a main longitudinal tubular frame member of a tricycle and the method of fabricating the same. Although the invention is susceptible to other applications, it is described herein with reference to manufacture of the velocipede frame in view of its particular utility in such environment.

In a common design or type of velocipede frame, such as a tricycle, the front end of a main curved central longitudinal tubular member is provided with a head tube to mount in rotatable or swivel fashion the fork stem of a front steering wheel of the vehicle, the main tube usually being secured near mid-length of the relatively short head tube by a welding or brazing operation, with the axes of the tubes being coplanar but usually somewhat oblique to each other. Because of its advantages as a step in frame fabrication in place of welding operations on single frame units, as well as the form of the resulting joint, both preferable for lower cost mass production methods, furnace brazing of frame joints is now used.

To this purpose the head post tube is formed with a more or less circular aperture into which is press fitted the end of the main tube member, the joint being thereafter brazed for assembly by methods of hydrogen furnace brazing. Generally some type of reinforcement is required in the head post tube at the region of the joint to build up the thickness of the wall or metal into which the main tube is press fitted for braze joining purposes.

Thus in prior practice a head post tube has been formed by blanking out from flat sheet metal stock a blank generally rectangular in outline form but having semicircular notches similarly disposed in two opposed sides, which blank thereafter is formed into an apertured cylinder or shell bringing the notched sides together along a longitudinal line or seam location. An internal reinforcing piece is provided by blanking, perforating and forming flat sheet metal stock into a second generally rectangular blank of smaller dimensions than the main tube blank previously described, having a central aperture corresponding in size to that of the head tube cylinder with a plurality of welding projections spaced about its aperture by denting or locally displacing the metal toward one side of the resulting blank. The second blank is thereafter curved to the form of a portion of a cylindric surface with its convex side complementary to the internal surface of the main cylinder, the said projections being on such convex side.

The reinforcing piece is next located in the first cylinder or shell with apertures coincident and with the main cylinder suitably clamped so that the edges of the metal in its longitudinal seam are firmly abutting; and the reinforcing member is then nested therein with the apertures coincident and affixed thereto for example by a resistance welding operation, whereby welded bonds between shell and reinforcement are formed at the regions of the said projections on opposite sides of the seam, at the same time the reinforcement being brought into close contact over substantially its entire area with the interior of the main tube. The wall aperture of the resulting composite tube element is reamed to provide a finished aperture shape and dimension adapted to receive the end of a main tubular frame member in a press fit suitable for a furnace brazing operation. Thereafter brazing metal and flux is applied to the head post tube and to the main frame tube as required and the joint completed by passing through a brazing furnace.

In such prior practice the application of the brazing material in the regions to be joined has presented some problem by way of the manipulations required to apply the brazing metal, of assuring retention of the brazing metal in proper position during further handling up to the brazing furnace or in the brazing operation itself, and also in obtaining evenness and completeness of dispersal of the brazing metal by capillary action throughout the regions to be joined during the very step of furnace brazing. It is the general object of the instant invention to obviate one or more of such problems.

Figure 4:
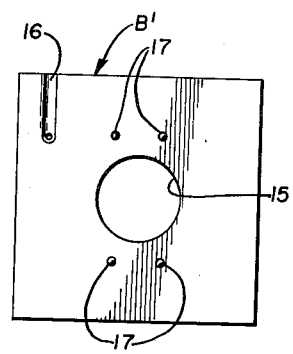
Figure 2:
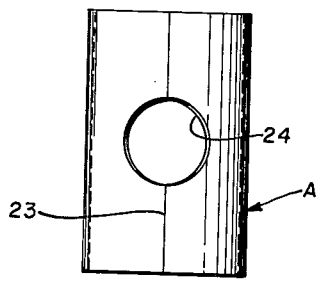
Figure 5:
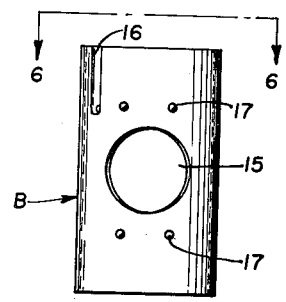
Figure 3:
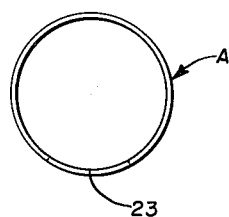
Figure 6:
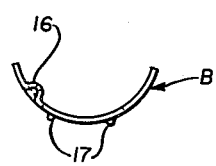
Figure 8:
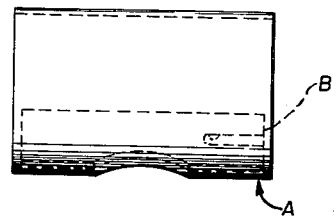
Figure 7:
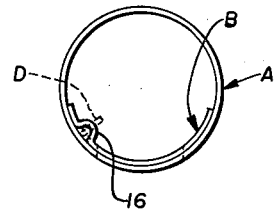
Figure 9:
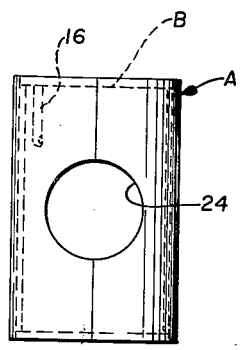

The present invention offers an improvement of the elements entering a reinforced joint structure, and of method of fabricating the same, and provides in or between the parts of the composite tube an elongated recess pocket or the like for reception of a length of the brazing metal in such form that the brazing metal is easily inserted into the composite, and there retained with certainty in subsequent operations up to the brazing step. Further the sheet formation and method of application of the brazing metal insures a minimum of rejections because of failure of the brazed metal to spread properly over the entire joint regions during the brazing operation. These obviously advantageous features are obtained by the reinforcement structure or composite head tube structure and fabrication method disclosed in the following description and drawings wherein:

FIG. 1 represents a flat blank for the shell or main element of the head tube;
FIG. 2 is an elevational rear view of the tube or shell resulting by forming the blank of FIG. 1 into a cylinder;
FIG. 3 is an end view corresponding to FIG. 2;
FIG. 4 is a flat blank for a reinforced element;
FIG. 5 is a rear view of the blank of FIG. 4 after being curved into final form;
FIG. 6 is an end view of FIG. 5;
FIG. 7 is an end view of the composite tube resulting from assembly of the shell and reinforcement elements;
FIG. 8 is a side view of the composite;
FIG. 9 is a back view of the composite; and
FIG. 10 is a fragmentary side view of the front end of a main vehicle frame tube and of the head post tube assembled thereon.

Figure 10:
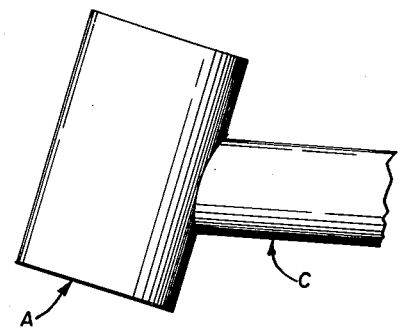

In the drawings for purposes of illustration FIGS. 1 and 2–3 indicate the manner of forming the main shell A of a head tube element of a tricycle frame, and FIGS. 4, 5 and 6 the formation of a reinforcement element B, which elements are subsequently brought together into the composite tube subassembly represented in FIGS. 7–9, for providing a head post tube A carried at the front end of a main frame member C for a tricycle frame as shown in FIG. 10.

For the main body or shell of the head tube a generally rectangular piece is blanked out of sheet steel to the flat form of FIG. 1, with dimensions of the top and bottom margins 11—11 and of sides 13—13 corresponding respectively to the circumference and length desired in the final tube, and with each side 13 having a like disposed semicircular notch 14. The notches are here shown at mid-length of the blank to result in a symmetrical tube. This blank A′ is next roll curled or may be formed about a mandrel to produce the generally cylindrical tube A of FIG. 2, the edges 13 therefor being brought together in abutting relation at a joint or seam line 23 with the semicircular notches 14—14 forming a rear aperture 24.

To produce the reinforcement piece again a generally rectangular piece B′ is blanked out of sheet steel, shorter in length than the steel shell blank and a fraction of its width, and having an aperture 15 substantially centered on vertical and horizontal center lines. There is also produced in the flat blank B' a groove 16 running inwardly from the top edge at the left of the center line in FIG. 4, by local displacement of metal from the plane of the blank into a rib and also four like dents or depressions forming welding projections 17 displaced relative to the plane of the blank oppositely to the displacement of metal at 16. Where a reinforcement blank is about 2½ inches square for use in a head post tube structure 2¾ inches long and 2 inch normal O.D., affixed to a 1¼ inch frame tube, a groove about ⅞ inch long with about 5/64 inch radius and located as indicated in the drawings, is sufficient. The projections 17 are generally equally spaced with respect to the vertical and the horizontal center lines as shown, and may for example be about .05 inch high, 5/32 inch in diameter with a blank of 16 ga. steel. Thereafter the blank B' is rolled or curved to the form of a finished reinforcement B shown in FIGS. 5 and 6 as a portion of the cylindrical shell having the radius of outside curvature substantially equal to that of the inside radius of the shell A, with the projections 17 and groove aspect of 16 on the convex side. A perforated 16 gauge strip of stock roll formed and cut into reinforcing pieces may be formed instead of the blanking operation described.

The formed elements A and B are next assembled into the composite head tube structure or subassembly by placing B inside A in parallel disposition with the apertures thereof coincident, A being so clamped that the edges 13 are in firm abutting relation along the joint 23. Thereafter the two pieces are welded together locally at the points of local contact provided by projections 17 bearing on the inside surface of member A, as may be done by supporting or clamping member A in a correspondingly curved seat; and then applying radial pressure on B during the time of said resistance welding at points 17 with current or electrodes applied locally in the region surrounding the points 17 so that with the latter yielding back into the major surface of B under welding heat, the facing curved surface of A and B are brought up against each other. A pocket is thus formed between the adjacent surfaces of the elements A and B at a location above the tube receiving opening of the assembly.

As a type of welding operation suitable for this purpose, resistance welding may be named with the clamping means of A and pressure and guiding means for B including work contact electrode elements of the welding current circuit. Thus the points 17 provide localized initial welding contact with localized heating and fusion of the metal and under the applied pressure metal of the points 17 yields back into the region from which it was originally displaced or deformed as the matching surfaces of pieces A and B are brought into extended contact.

After the pieces A and B have been subassembled in the manner stated into a composite head post tube the aperture through the two layers of metal is reamed to required final size and shape for reception of the end of a main vehicle frame tube 25 in a press fit suitable for a furnace brazing operation, i.e., with the opening reamed to a diameter .002 to .003 inch less than the diameter of the tube C. Preferably after the press fit is made a length of copper brazing metal or other suitable brazing material is applied by inserting the same into the pocket provided in the composite between the outer shell metal and the reinforcement metal by the aforesaid groove 16 which is easily accessible from one end of the head post tube and such brazing wire is easily retained in place either by its wedging form or by bending over a projecting end across the end of the reinforcement piece within the tube. (This step by virtue of the retention of the brazing metal could be carried out even before the final press fit of the tubes.) Thereafter the head post joint with suitable brazing flux supplied is brazed to the main frame member by passing of the entire frame through a hydrogen brazing furnace at about 2000° F. while positioned with the pocket opening extending upwardly for completion of this brazed joint and any others to be completed in the frame. The molten copper flows about the circumference of the press fitted tube 25 and between the juxtaposed surfaces of the head tube and reinforcing plate and along the seam of the head tube under the influence of gravity and capillary attraction.

It will be understood that mill bright sheet or strip metal is to be used in forming the head elements A and B and the tube 25 whereby clean joints requiring no subsequent cleanup operations are formed between head structure and tube.

I claim:

The method of forming a tubular joint in a velocipede frame head structure comprising: blanking out from sheet metal a rectangular piece having in opposed edges notches adapted to form an aperture when said piece is curled into cylindrical form with said edges abutting in a longitudinal joint and curling the same into said cylindrical form; blanking and forming a second rectangular sheet metal piece having a perforated aperture corresponding in size to the first said aperture and of size and curvature complementary to a limited portion of the interior of said cylindrical form and having electric weld localizing bosses at spaced locations from its aperture and on a convex side thereof; electrically welding said two pieces together to form a reinforced head tube including two said pieces in laminated relation with the second piece forming an inner of two laminations and with the apertures thereof coincident; the second piece upon initial forming being shaped to include a local deformation at one edge providing a brazing metal receiving pocket between the laminations accessible endwise of the head tube for brazing material insertion when the laminations are brought together with the pocket formation located above the apertures; precision reaming the apertures of the laminations; press fitting a frame tube end into the reamed apertures; inserting brazing copper in the pocket; positioning the fitted head tube and frame tube in a brazing furnace with the pocket extending upwardly; and subjecting the laminations and tube to a copper brazing temperature thereby to cause the brazing copper in the pocket to melt and flow under the influence of gravity and capillary attraction between the laminations and between the reamed surfaces of the laminations and the circumference of the press fitted tube.

References Cited in the file of this patent

UNITED STATES PATENTS

| | | |
|---|---|---|
| 858,258 | Briscoe et al. | June 25, 1907 |
| 1,916,989 | Rader | July 4, 1933 |
| 2,397,370 | Raven et al. | Mar. 26, 1946 |
| 2,435,448 | Kraeft et al. | Feb. 3, 1948 |
| 2,460,667 | Wurzburger | Feb. 1, 1949 |
| 2,615,235 | Hadley | Oct. 28, 1952 |

FOREIGN PATENTS

| | | |
|---|---|---|
| 21,380 | Australia | Jan. 2, 1930 |
| 228,190 | Great Britain | July 9, 1925 |